(12) United States Patent
Finkelstein

(10) Patent No.: US 9,462,320 B2
(45) Date of Patent: Oct. 4, 2016

(54) MULTI-MODAL DIGITAL TERMINAL ADAPTER

(71) Applicant: Cox Communications, Inc., Atlanta, GA (US)

(72) Inventor: Jeff Finkelstein, Atlanta, GA (US)

(73) Assignee: Cox Communications, Atlanta, GA (US)

( * ) Notice: Subject to any disclaimer, the term of this patent is extended or adjusted under 35 U.S.C. 154(b) by 0 days.

(21) Appl. No.: 14/463,375

(22) Filed: Aug. 19, 2014

(65) Prior Publication Data

US 2016/0057477 A1 Feb. 25, 2016

(51) Int. Cl.

| H04N 7/167 | (2011.01) |
|---|---|
| H04N 21/418 | (2011.01) |
| H04N 21/438 | (2011.01) |
| H04N 21/4405 | (2011.01) |
| H04N 21/61 | (2011.01) |
| H04N 21/258 | (2011.01) |
| H04N 21/45 | (2011.01) |
| H04N 21/44 | (2011.01) |
| H04N 21/234 | (2011.01) |

(52) U.S. Cl.
CPC .... *H04N 21/4181* (2013.01); *H04N 21/23418* (2013.01); *H04N 21/25833* (2013.01); *H04N 21/4382* (2013.01); *H04N 21/4405* (2013.01); *H04N 21/44008* (2013.01); *H04N 21/4516* (2013.01); *H04N 21/6112* (2013.01); *H04N 21/6118* (2013.01); *H04N 21/6125* (2013.01)

(58) Field of Classification Search
USPC .......................................................... 725/31
See application file for complete search history.

(56) References Cited

U.S. PATENT DOCUMENTS

| 2007/0100480 | A1* | 5/2007 | Sinclair | G06F 1/263 700/48 |
|---|---|---|---|---|
| 2010/0287593 | A1* | 11/2010 | Sayadi | H04L 1/1812 725/62 |
| 2012/0321058 | A1* | 12/2012 | Eng | H04L 45/00 379/90.01 |
| 2014/0307106 | A1* | 10/2014 | Hughes | H04N 21/25833 348/191 |

\* cited by examiner

*Primary Examiner* — Pankaj Kumar
*Assistant Examiner* — Charles N Hicks
(74) *Attorney, Agent, or Firm* — Sutherland Asbill & Brennan LLP

(57) ABSTRACT

A multi-modal digital terminal adapter (DTA), and associated methods and computer-readable media, are disclosed for determining a current mode of operation of the DTA, selectively activating and/or deactivating one or more receiving modules based at least in part on the current mode of operation, and routing an incoming signal to one or more receiving modules based at least in part on one or more characteristics of the signal to initiate processing of the signal in accordance with the current mode of operation for the multi-modal DTA.

20 Claims, 3 Drawing Sheets

MULTI-MODAL DIGITAL TERMINAL ADAPTER

BACKGROUND

A variety of types of customer premises equipment exist for receiving digital cable signals, demodulating the signals, and decoding the signals to identify the information contained therein. Example types of customer premises equipment include set-top boxes, digital television adapters, and so forth. In addition, a number of content streaming devices capable of rendering video content transmitted over an Internet Protocol (IP) network have appeared in recent years.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1A:
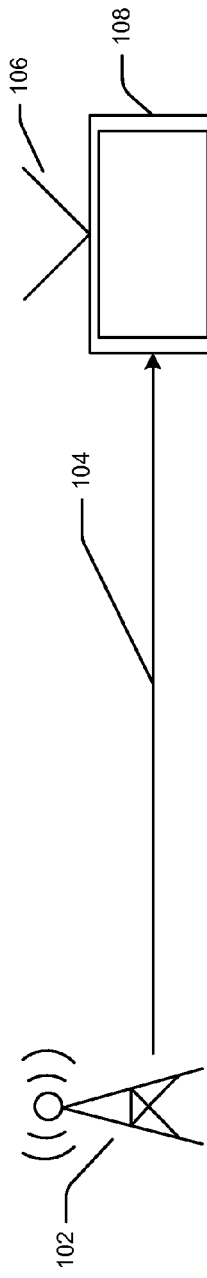
FIGS. 1A-1C are schematic block diagrams of various illustrative architectures for the receipt of analog or digital television signals in accordance with one or more example embodiments of the disclosure.

This disclosure relates to, among other things, a multi-modal digital terminal adapter (DTA), and associated methods, computer-readable media, techniques, and methodologies for determining a current mode of operation for the multi-modal DTA among multiple available modes of operation and processing an incoming signal in accordance with the determined mode of operation.

A multi-modal DTA in accordance with example embodiments of the disclosure may be used as a substitute for a set-top box. For example, a multi-modal DTA may include a demodulator configured to demodulate a modulated incoming signal. The incoming signal may be, for example, a digital cable signal that is modulated in accordance with any suitable modulation scheme such as, for example, quadrature amplitude modulation (e.g., 64-QAM, 256-QAM, etc.). The demodulator may be, for example, a QAM demodulator capable of demodulating an incoming signal that has been modulated in accordance with a QAM modulation scheme.

A multi-modal DTA in accordance with example embodiments of the disclosure may further include a decryption chip configured to decrypt an incoming signal. Digital cable systems provide the capability to encrypt a digital signal. Encryption was unavailable for earlier analog cable systems which utilized scrambling instead. The decryption chip may be configured to decrypt an incoming encrypted digital signal using any suitable cryptographic technique such as public/private key encryption/decryption.

A multi-modal DTA in accordance with example embodiments of the disclosure may further include one or more multi-modal operation module(s) that may be implemented in any combination of software, hardware, and/or firmware. The multi-modal operation module(s) may be configured to determine a current mode of operation for the multi-modal DTA and process an incoming signal based on the determined mode of operation. For example, the multi-modal operation module(s) may receive a notification message or the like indicating the mode of operation in accordance with which the multi-modal DTA should operate. For example, the notification message may be transmitted to the multi-modal DTA as part of a provisioning and/or configuration of the DTA. Additionally, or alternatively, configurable settings of the multi-modal DTA may specify the mode of operation.

A multi-modal DTA in accordance with example embodiments of the disclosure may include a tuner that is configured to detect incoming signals across a range of frequencies. A multi-modal DTA in accordance with example embodiments of the disclosure may further include a channelizer that is configured to receive signals detected by the tuner and partition or otherwise identify one or more channels within the range of frequencies. Each channel may include any suitable range of frequencies (e.g., a 6 MHz range). After an incoming signal is separated into constituent channels by the channelizer, the demodulator may demodulate the signal. As part of demodulating the signal, header information included in data packets of the signal may be identified and one or more characteristics of the signal may be determined from the header information. For example, the header information may indicate that the signal is a digital cable signal, an IP video signal, a data signal formatted in accordance with the Data Over Cable Service Interface Specification (DOCSIS), or the like.

Upon identifying the type of signal from, for example, the header information, the signal may be routed to an appropriate receiving module for processing. For example, an operating system kernel (e.g., a Linux kernel) may include or manage one or more receiving modules. Each receiving module may receive and facilitate processing of a corresponding type of signal and may be activated or deactivated based on the current mode of operation of the multi-modal DTA. If a particular receiving module is activated, the corresponding received signal may be processed in accordance with the type of signal. Processing of a signal may include, without limitation, demodulation, decryption, rendering, or combinations thereof. If, on the other hand, a particular receiving module is not activated, the receiving module may not process the received signal. Alternatively, each receiving module may receive all signal traffic and may process, if activated, only those signals that the receiving module is configured to process.

For example, if the multi-modal operation module(s) determine that digital cable signals are to be processed in accordance with the current mode of operation of the multi-modal DTA (hereinafter referred to at times as a "digital cable mode"), the multi-modal operation module(s) may activate or instruct the kernel to activate the corresponding receiving module thereby ensuring that incoming digital cable signals are processed accordingly. For example, an incoming signal may be demodulated by a demodulator, and header information contained in the data packets of the signal may be analyzed to identify which receiving module should receive the data packets. If the header information indicates that the signal is a digital cable signal, the data packets may be routed to an appropriate receiving module which, if activated, may direct a decoder to decode the signal (if the signal has been encoded with a digital compression algorithm), and may further direct the decryption chip to decrypt the signal (if encrypted). The associated video and audio content contained in the demodulated, decoded, and decrypted signal may then be rendered by a display device (e.g., television) to which the multi-modal DTA is connected. Alternatively, as previously described, each receiving module may receive all signal traffic, and activation of the corresponding receiving module may cause digital cable signals included in the signal traffic to be processed, while deactivation of other receiving modules may result in other signal traffic being dropped (e.g., not processed for rendering of associated content).

If, on the other hand, the multi-modal operation modules determine that signals that include data packets delivered over a packet-switched network using an IP protocol are to be processed, the multi-modal operation module(s) may activate or direct the kernel to activate the corresponding receiving module. Signals identified as IP video signals from, for example, header information included in data packets of the signals may then be routed to the corresponding receiving module for processing. Processing of an IP video signal may cause decryption to be bypassed. For example, as part of activation of the receiving module corresponding to IP video signals, the multi-modal operation module(s) may make a system call to an operating system kernel which, in turn, may un-mount the decryption chip, thereby preventing decryption processing from being performed on an unencrypted IP video signal. Alternatively, the receiving module itself may initiate the system call. The IP video signal may then be rendered by a display device. Further, as noted above, in the alternative, each receiving module may receive all signal traffic, and activation of the corresponding receiving module may cause IP video signals included in the signal traffic to be processed, while deactivation of other receiving modules may result in other signal traffic being dropped (e.g., not processed for rendering of associated content).

In certain other example embodiments, the multi-modal operation module(s) may insert control signals into the received signal traffic. In such example embodiments, all receiving modules may be activated and may receive all signal traffic, and the control signals may trigger the appropriate receiving modules to initiate processing of corresponding signals. For example, a receiving module corresponding to digital cable signals may be triggered to initiate processing of digital cable signals by control signals included in the signal traffic, while other control signals may prevent the receiving module from being triggered in connection with other types of signals.

In certain example embodiments, a multi-modal DTA in accordance with example embodiments of the disclosure may be configured to convert a digital signal (e.g., a digital television signal) to an analog signal capable of being rendered by a device (e.g., a television) that may not be equipped with a digital tuner. A multi-modal DTA in accordance with example embodiments of the disclosure may be configured to receive over-the-air (OTA) digital signals and convert the digital signals to analog signals. Thus, the multi-modal DTA may function, at least in part, as a digital-to-analog converter and may serve as a substitute for an Advanced Television Systems Committee (ATSC) tuner for devices (e.g. analog televisions) that lack such a tuner.

Example embodiments of the disclosure provide a number of advantages or technical effects. For example, in accordance with the example embodiments of the disclosure, a multi-modal DTA may serve as a cost-effective substitute for a set-top box and may provide the capability to operate in accordance with multiple modes of operation to selectively process different types of signals based on a current mode of operation. For example, a multi-modal DTA in accordance with one or more example embodiments may operate in accordance with an operational mode in which incoming digital cable signals are demodulated, decoded, decrypted, and rendered as well as an operational mode in which decryption processing is bypassed for an incoming IP video signal and the IP video signal is processed and rendered. It should be appreciated that the above examples of advantages and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Figure 1B:
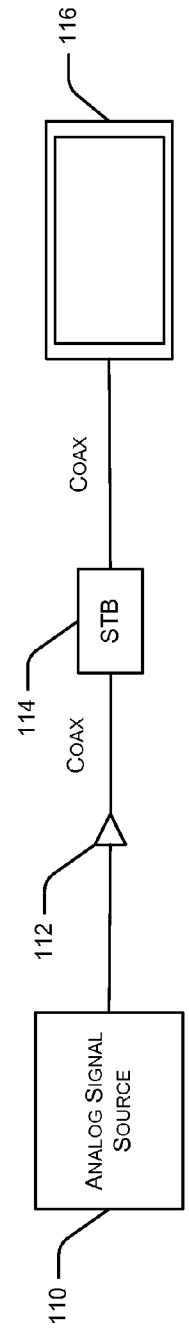
Figure 1C:
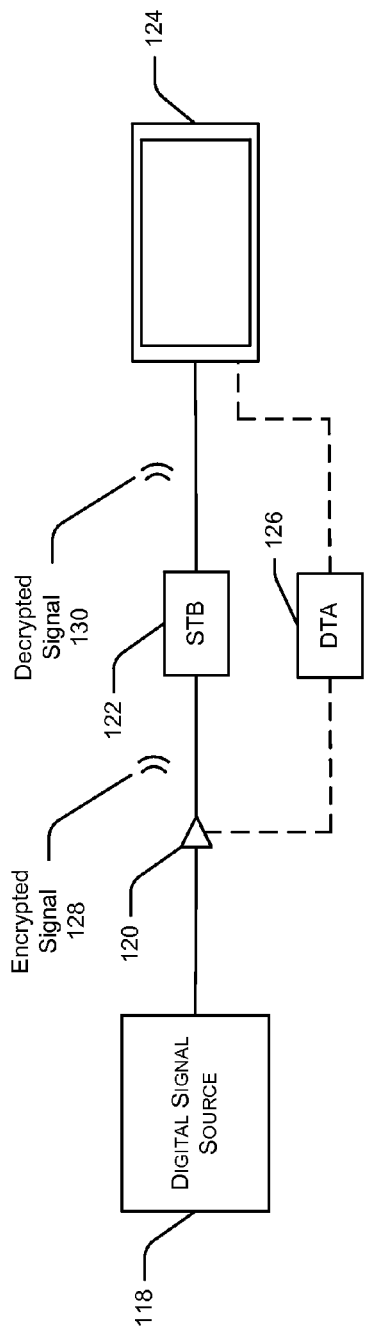

FIGS. 1A-1C are schematic block diagrams of various illustrative architectures for the receipt of analog or digital television signals in accordance with one or more example embodiments of the disclosure.

As shown in FIG. 1A, in older analog broadcast systems, a broadcast antenna provided as part of, for example, a tower infrastructure 102 may broadcast analog over-the-air television signals 104. An analog television 108 may receive the analog signals 104 via a local antenna 106. The analog television 108 may be provided with a National Television Systems Committee (NTSC) tuner or the like configured to process the analog signals 104 for rendering on the analog television 108.

As shown in FIG. 1B, with the advent of cable television architectures, an analog signal originating at an analog signal source 110 (e.g., a cable head-end) may travel through a series of amplifiers 112 to a set-top box (STB) 114 provided at a customer premises. The STB 114 may be configured to communicate via a coaxial connection with a television 116. Early cable systems included coaxial lines extending from the head-end to the customer premises. Later evolutions of cable system architectures included optical fiber from the head-end to various optical splitters and coaxial cables from the optical splitters to customers' premises. Various fiber-to-the-premises (FTTP) architectures have now been deployed in which optical fiber extends from the head-end to a location that is in closer proximity to the customers' premises.

Most cable system architectures have now transitioned to the digital cable architecture depicted in FIG. 1C. In the example architecture shown in FIG. 1C, a digital signal originating at a digital signal source (e.g., a cable head-end) travels along optical fiber and/or coaxial physical media through a series of amplifiers 120 until the signal reaches a STB 122. The digital signal may be modulated using, for example, a QAM digital modulation scheme. The STB 122 may be configured to demodulate the signal so that the video and audio content of the signal can be rendered on a television 124. In certain example embodiments, the digital signal 128 may be encrypted. The STB 122 may be configured to decrypt the encrypted signal to produce a decrypted signal 130.

In accordance with example embodiments of the disclosure, a multi-modal DTA 126 may be provided as a substitute for the STB 122. The multi-modal DTA 126 may similarly be configured to demodulate, decode, and decrypt incoming digital signals so that video and audio content of the signal can be rendered by the television 124. The multi-modal DTA 126 may further provide a capability to transition between multiple modes of operation depending on the provisioning and/or configuration of the DTA 126. The multi-modal DTA 126 may, however, provide a reduced set of functionality with respect to the STB 122 (e.g., reduced user interactivity, reduced on-demand programming options, etc.), and thus, may be manufactured and provided to a customer at a significantly lower cost than the STB 122.

Illustrative Device Architecture

Figure 2:
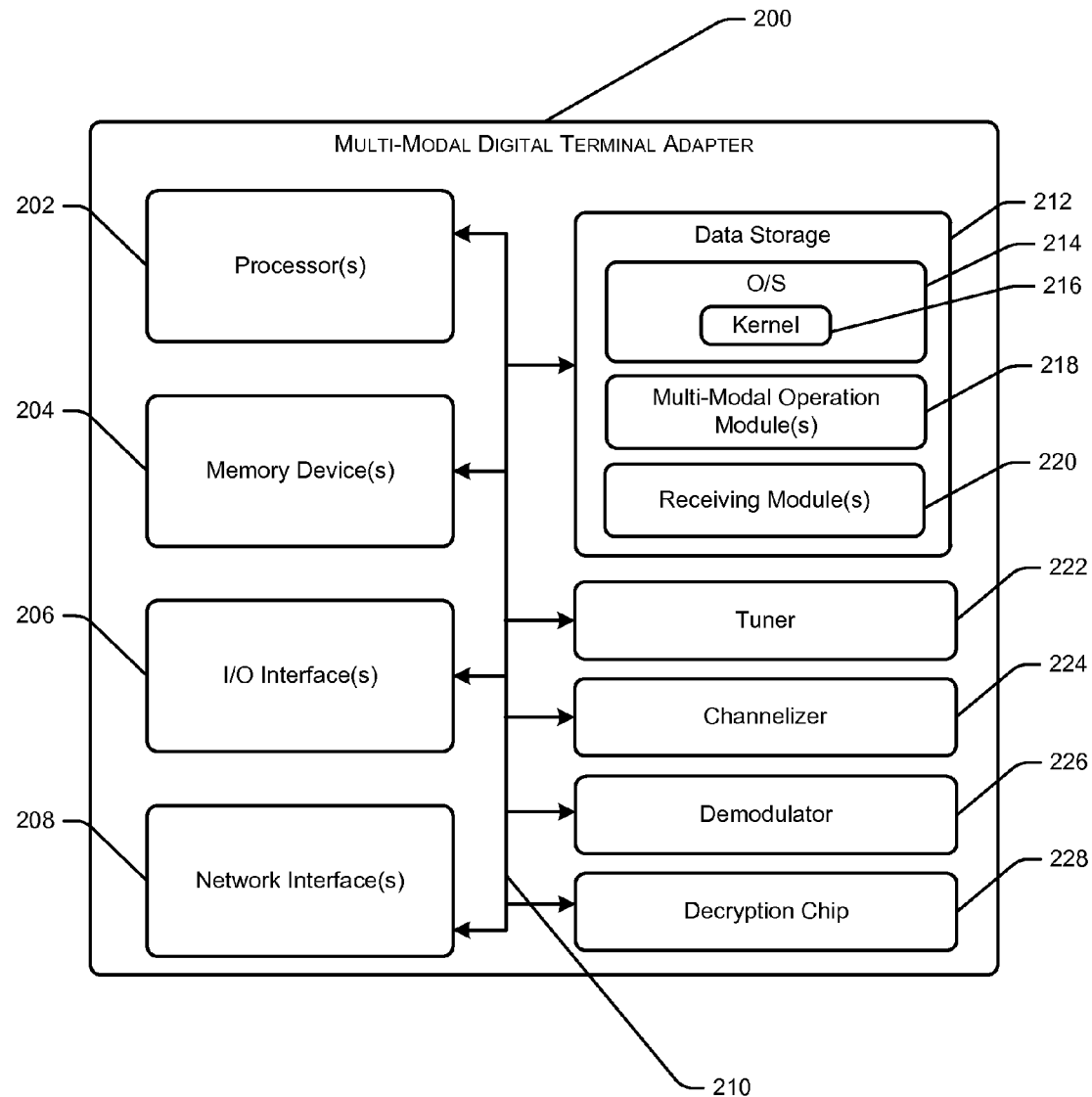
FIG. 2 is a schematic block diagram of an illustrative multi-modal digital terminal adapter in accordance with one or more example embodiments of the disclosure.

FIG. 2 is a schematic block diagram of an illustrative multi-modal DTA 200 in accordance with one or more example embodiments of the disclosure. In an illustrative configuration, the device 200 may include one or more processors (processor(s)) 202, one or more memory devices 204 (generically referred to herein as memory 204), one or more input/output ("I/O") interface(s) 206, one or more network interfaces 208, data storage 212, a tuner 222, a channelizer 224, a demodulator 226, and a decryption chip 228. The device 200 may further include one or more buses 210 that functionally couple various components of the device 200. These various components will be described in more detail hereinafter.

The bus(es) 210 may include at least one of a system bus, a memory bus, an address bus, or a message bus, and may permit exchange of information (e.g., data (including computer-executable code), signaling, etc.) between various components of the device 200. The bus(es) 210 may have any of a variety of bus structures including, without limitation, a memory bus or a memory controller, a peripheral bus, an accelerated graphics port, and so forth. The bus(es) 210 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, a Serial Peripheral Interface architecture, and so forth.

The memory 204 of the device 200 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 204 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 204 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 212 may include removable storage and/or non-removable storage including, but not limited to, magnetic storage, optical disk storage, and/or tape storage. The data storage 212 may include, for example, memory cards, USB flash drives, external hard disk drives, optical discs, and so forth. The data storage 212 may provide non-volatile storage of computer-executable instructions and other data. The memory 204 and the data storage 212, removable and/or non-removable, are examples of computer-readable storage media (CRSM) as that term is used herein.

The data storage 212 may store computer-executable code, instructions, or the like that may be loadable into the memory 204 and executable by the processor(s) 202 to cause various operations to be performed. In certain example embodiments, computer-executable code stored in the data storage 212 may be executable by the processor(s) 202 directly from the data storage 212. The data storage 212 may additionally store data that may be copied to memory 204 for use by the processor(s) 202 during the execution of the computer-executable instructions. Moreover, output data generated as a result of execution of the computer-executable instructions by the processor(s) 202 may be stored initially in memory 204, and may ultimately be copied to data storage 212 for non-volatile storage.

More specifically, the data storage 212 may store one or more operating systems (O/S) 214; and one or more program modules, applications, or the like such as, for example, one or more multi-modal operation modules 218, one or more receiving modules 220, and so forth. Any of the modules depicted in FIG. 2 may include computer-executable code, instructions, or the like that may be loaded into the memory 204 for execution by one or more of the processor(s) 202. The O/S 214 may include a kernel 216 (e.g., a Linux kernel) configured to, among other things, manage activation and deactivation of the receiving module(s) 220.

The processor(s) 202 may be configured to access the memory 204 and execute computer-executable instructions loaded therein. For example, the processor(s) 202 may be configured to execute computer-executable instructions of the various program modules of the memory 204 to cause or facilitate various operations to be performed in accordance with one or more embodiments of the disclosure. The processor(s) 202 may include any suitable processing unit capable of accepting data as input, processing the input data in accordance with stored computer-executable instructions, and generating output data. The processor(s) 202 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 202 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 202 may be capable of supporting any of a variety of instruction sets.

The device 200 may further include a tuner 222 configured to detect incoming signals across a range of frequencies, a channelizer 224 configured to receive signals detected by the tuner 222 and partition or otherwise identify one or more channels included therein, a demodulator 226 configured to demodulate modulated incoming signals, and a decryption chip 228 configured to decrypt encrypted signals. Although not depicted in FIG. 2, the device 200 may further include a decoder configured to decode signals encoded with any of a variety of digital compression encoding schemes. In certain example embodiments, an incoming signal may be, for example, a digital cable signal that is modulated in accordance with any suitable modulation scheme such as, for example, quadrature amplitude modulation (e.g., 64-QAM, 256-QAM, etc.). The demodulator 226 may be, for example, a QAM demodulator (e.g., a QAM tuner) capable of demodulating an incoming signal that has been modulated in accordance with a QAM modulation scheme. In other example embodiments, an incoming signal may be an IP video signal or any other suitable digital signal.

Referring now to functionality supported by the various program modules depicted in FIG. 2, the multi-modal operation module(s) 218 may include computer-executable instructions, code, or the like that responsive to execution by one or more of the processor(s) 202 may cause a current mode of operation for the device 200 to be determined. The current mode of operation may be determined from a notification message received by the device 200 in response to a provisioning request transmitted by the device 200. Additionally, or alternatively, the current mode of operation may be determined based on a configuration of the device 200. Based on the determined mode of operation, the multi-modal operation module(s) 218 may activate or direct the kernel 216 to activate one or more of the receiving module(s) 220 corresponding to the determined mode of operation and deactivate those receiving module(s) 220 not corresponding to the determined mode of operation.

As previously described, as part of demodulating incoming signals, header information included in data packets of the signals may be identified and one or more characteristics of the signals may be determined from the header information. For example, the header information may indicate that a signal is a digital cable signal, an IP video signal, a data signal formatted in accordance with DOCSIS, or the like. Upon identifying the type of signal from, for example, the header information, the multi-modal operation module(s) 218 and/or the kernel 216 may route the signal to an appropriate receiving module 220 for processing. If a particular receiving module is activated, the corresponding received signal may be processed in accordance with the type of signal. Processing of a signal may include, without limitation, demodulation, decryption, rendering, or combinations thereof. If, on the other hand, a particular receiving module 220 is not activated, the receiving module may not process the received signal. Alternatively, as previously described, each receiving module 220 may receive all signal traffic and may process, if activated, only those signals that the receiving module 220 is configured to process.

For example, if the multi-modal operation module(s) 218 determine that device 200 is to operate in a digital cable mode, the multi-modal operation module(s) 218 may activate or instruct the kernel 216 to activate the corresponding receiving module 220 thereby ensuring that incoming digital cable signals are processed accordingly. For example, an incoming signal may be demodulated by the demodulator 226, and header information contained in the data packets of the signal may be analyzed to identify which receiving module 220 should receive the data packets. If the header information indicates that the signal is a digital cable signal, the data packets may be routed to an appropriate receiving module 220 which, if activated, may direct a decoder (not shown) to decode the signal (if the signal has been encoded with a digital compression algorithm), and may further direct the decryption chip 228 to decrypt the signal (if encrypted). The associated video and audio content contained in the demodulated, decoded, and decrypted signal may then be rendered by a display device (e.g., television) to which the device 200 is connected. Alternatively, as previously described, each receiving module 220 may receive all signal traffic, and activation of the corresponding receiving module 220 may cause digital cable signals included in the signal traffic to be processed, while deactivation of other receiving modules 220 may result in other signal traffic being dropped (e.g., not processed for rendering of associated content).

If, on the other hand, the multi-modal operation module(s) 218 determine that the device 200 is to operate in an IP video mode, the multi-modal operation module(s) 218 may activate or direct the kernel 216 to activate the corresponding receiving module 220. Signals identified as IP video signals from, for example, header information included in data packets of the signals may then be routed to the corresponding receiving module 220 for processing. Processing of an IP video signal may cause decryption to be bypassed. For example, as part of activation of the receiving module 220 corresponding to IP video signals, the multi-modal operation module(s) 218 and/or receiving module 220 may make a system call to the kernel 216 which, in turn, may un-mount the decryption chip 228, thereby preventing decryption processing from being performed on an unencrypted IP video signal. The IP video signal may then be rendered by a display device. Further, as noted above, in the alternative, each receiving module 220 may receive all signal traffic, and activation of the corresponding receiving module 220 may cause IP video signals included in the signal traffic to be processed, while deactivation of other receiving modules 220 may result in other signal traffic being dropped (e.g., not processed for rendering of associated content).

In certain other example embodiments, the multi-modal operation module(s) 218 may insert control signals into the received signal traffic. In such example embodiments, all receiving modules 220 may be activated and may receive all signal traffic, and the control signals may trigger the appropriate receiving modules 220 to initiate processing of corresponding signals. For example, a receiving module 220 corresponding to digital cable signals may be triggered to initiate processing of digital cable signals by control signals included in the signal traffic, while other control signals may prevent the receiving module 220 from being triggered in connection with other types of signals.

Referring to now to other illustrative components of the device 200, the O/S 214 may be loaded from the data storage 212 into the memory 204 and may provide an interface between other application software executing on the device 200 and hardware resources of the device 200. More specifically, the O/S 214 may include a set of computer-executable instructions for managing hardware resources of the device 200 and for providing common services to other application programs (e.g., managing memory allocation among various application programs). The O/S 214 may include any operating system now known or which may be developed in the future including, but not limited to, any proprietary or non-proprietary operating system (e.g., a Linux based operating system).

The device 200 may further include one or more input/output (I/O) interfaces 206 that may facilitate the receipt of input information by the device 200 from one or more I/O devices as well as the output of information from the device 200 to the one or more I/O devices. The I/O devices may include, for example, one or more user interface devices that facilitate interaction between a user and the device 200 including, but not limited to, a display, a keypad, a pointing device, a control panel, a touch screen display, a remote control device, a microphone, a speaker, and so forth. The I/O devices may further include, for example, any number of peripheral devices such as data storage devices, printing devices, and so forth. The device 200 may further include one or more network interfaces 208 via which the device 200 may communicate with any of a variety of other systems, platforms, networks, devices, and so forth. The input/output interface(s) 206 and/or the network interface(s) 208 may include or otherwise facilitate communication via any of a variety of types of serial or parallel ports including, without limitation, an Ethernet port, a USB port, a High-Definition Multimedia Interface (HDMI) port, a Video Graphics Array (VGA) port, a coaxial RF connector (female), and so forth.

The device 200 may further include one or more network interfaces 208 that may facilitate communication between the device 200 and one or more other devices via any suitable type of network. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

It should be appreciated that the program modules, applications, computer-executable instructions, code, or the like depicted in FIG. 2 as being stored in the data storage 212 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the device 200, and/or hosted on other computing device(s) accessible via one or more networks, may be provided to support functionality provided by the program modules, applications, or computer-executable code depicted in FIG. 2 and/or additional or alternate functionality. Further, functionality may be modularized differently such that processing described as being supported collectively by the collection of program modules depicted in FIG. 2 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 2 may be implemented, at least partially, in hardware and/or firmware across any number of devices.

It should further be appreciated that the device 200 may include alternate and/or additional hardware, software, or firmware components beyond those described or depicted without departing from the scope of the disclosure. More particularly, it should be appreciated that software, firmware, or hardware components depicted as forming part of the device 200 are merely illustrative and that some components may not be present or additional components may be provided in various embodiments. While various illustrative program modules have been depicted and described as software modules stored in data storage, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Illustrative Processes

Figure 3:
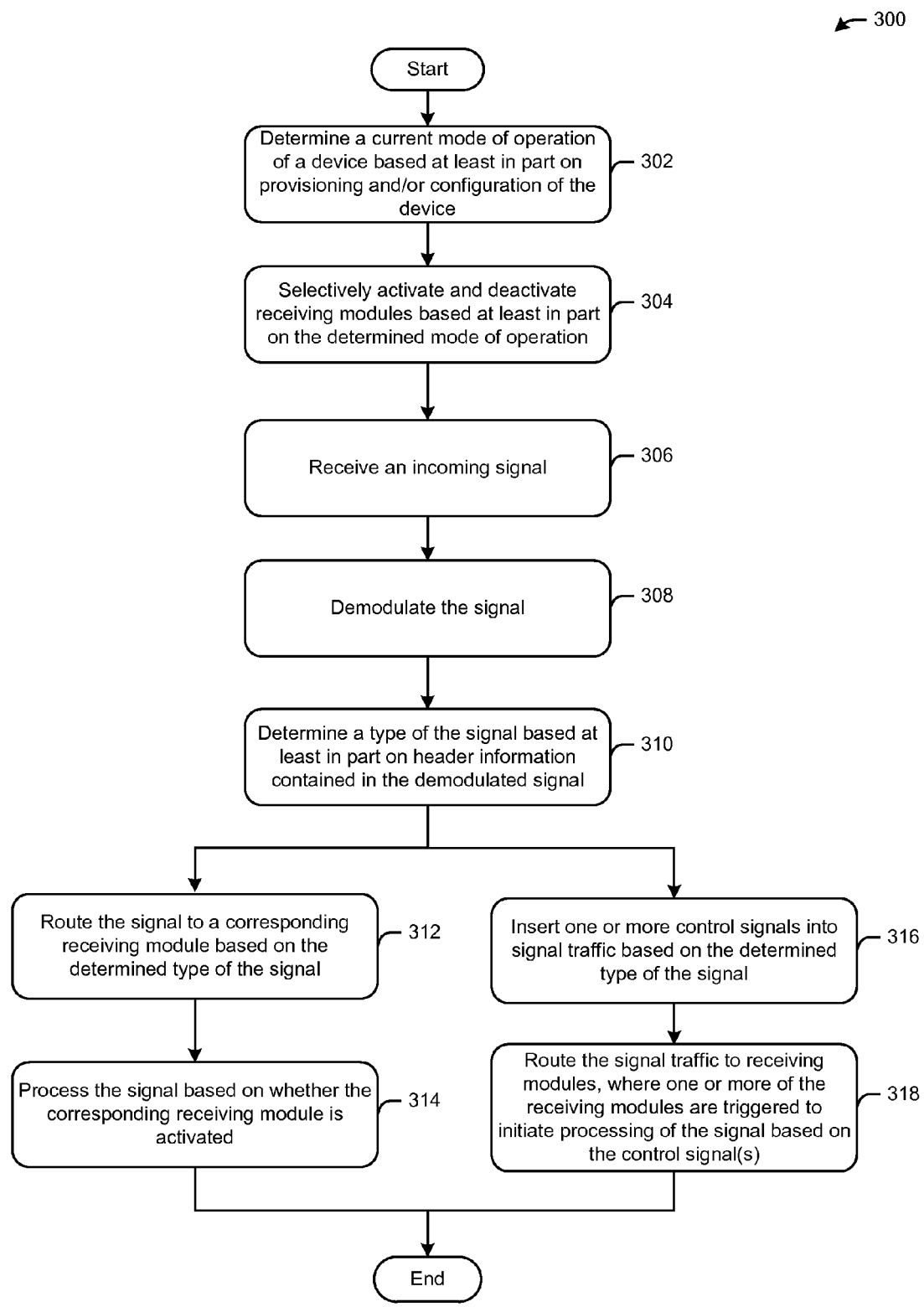
FIG. 3 is a process flow diagram of an illustrative method for determining an operational mode of a multi-modal digital terminal adapter in accordance with one or more example embodiments of the disclosure and identifying and processing an incoming signal in accordance with the determined operational mode.

FIG. 3 is a process flow diagram of an illustrative method for identifying and processing an incoming signal based on an operational mode of a multi-modal digital terminal adapter in accordance with one or more example embodiments of the disclosure. One or more operations of the method 300 may be described below as being performed by a device 200, or more specifically, by one or more components, program modules, applications, or the like executing on the device 200. It should be appreciated, however, that any of the operations of method 300 may be performed, at least in part, in a distributed manner by one or more other devices, or more specifically, by one or more components, program modules, applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the method 300 may be described in the context of a device 200 having the illustrative configuration depicted in FIG. 2, it should be appreciated that such operations may be implemented in connection with numerous other device configurations.

At block 302, computer-executable instructions of the multi-modal operation module(s) 218 may be executed to determine a current mode of operation of the device 200 based at least in part on provisioning and/or configuration of the device 200. For example, the device 200 may receive a provisioning message indicating the current mode of operation. Additionally, or in the alternative, the multi-modal operation module(s) 218 may determine the current mode of operation from configurable settings of the device 200.

At block 304, computer-executable instructions of the multi-modal operation module(s) 218 may cause one or more of the receiving module(s) 220 corresponding to the determined mode of operation to be selectively activated and one or more receiving module(s) 220 not corresponding to the determined mode of operation to be deactivated. Additionally, or alternatively, the multi-modal operation module(s) 218 may direct the kernel 216 to selectively activate and deactivate the receiving modules 220.

At block 306, the device 200 may receive an incoming signal. The signal may be, for example, a digital cable signal, an IP video signal, or the like. At block 308, the incoming signal may be demodulated by the demodulator 226.

At block 310, a type of the signal may be determined based at least in part on header information contained in the demodulated signal. For example, the header information may indicate that a signal is a digital cable signal, an IP video signal, a data signal formatted in accordance with DOCSIS, or the like.

In certain example embodiments, upon identifying the type of signal from, for example, the header information, the multi-modal operation module(s) 218 and/or the kernel 216 may route the signal, at block 312, to an appropriate receiving module 220 for processing. If a particular receiving module is activated, the corresponding received signal may be processed in accordance with the type of signal at block 314. If, on the other hand, a particular receiving module 220 is not activated, the receiving module may not process the received signal at block 314. Alternatively, as previously described, each receiving module 220 may receive all signal traffic and may process, if activated, only those signals that the receiving module 220 is configured to process.

In certain other example embodiments, the multi-modal operation module(s) 218 may insert control signals into the received signal traffic at block 316. In such example embodiments, all receiving modules 220 may be activated and may receive all signal traffic at block 318, and the control signals may trigger the appropriate receiving modules 220 to initiate processing of corresponding signals. For example, a receiving module 220 corresponding to digital cable signals may be triggered to initiate processing of digital cable signals by control signals included in the signal traffic, while other control signals may prevent the receiving module 220 from being triggered in connection with other types of signals.

The operations described and depicted in the illustrative method of FIG. 3 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 3 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method, comprising:
   determining, from among a plurality of operation modes, a current mode of operation of a multi-modal device, the plurality of operation modes comprising at least a decryption mode for a first signal type and a decryption processing bypass mode for a second signal type, the multi-modal device rendering audio and video content corresponding to either the first signal type or the second signal type;
   activating a first receiving module of the multi-modal device based at least in part on the current mode of operation;
   receiving, at the multi-modal device, a signal;
   determining, by the multi-modal device, one or more characteristics of the signal; and
   routing, by the multi-modal device, the signal to the first receiving module to initiate processing of the signal in accordance with the current mode of operation.

2. The method of claim 1, wherein determining the current mode of operation comprises at least one of: i) receiving a provisioning message indicating the current mode of operation or ii) determining the current mode of operation based at least in part on a configuration of the multi-modal device.

3. The method of claim 1, further comprising deactivating a second receiving module of the multi-modal device based at least in part on the current mode of operation.

4. The method of claim 1, wherein determining one or more characteristics of the signal comprises demodulating the signal to produce a demodulated signal and identifying a type of the signal from header information included in the demodulated signal.

5. The method of claim 4, wherein the signal is a digital cable signal, and wherein processing of the signal comprises:

decoding, by a decoder of the multi-modal device, the signal to produce a decoded signal; and decrypting, by a decryption chip of the multi-modal device, the decoded signal to produce a decrypted signal.

6. The method of claim 4, wherein the signal is an IP video signal, and wherein the processing of the signal comprises:
generating, by the multi-modal device, a system call to bypass decryption processing for the signal.

7. The method of claim 6, wherein the processing of the signal further comprises:
unmounting, by an operating system kernel of the multi-modal device, an encryption chip of the multi-modal device responsive to the system call.

8. A multi-modal device, comprising:
at least one processor; and
at least one memory storing computer-executable instructions comprising an operating system kernel and one or more receiving modules,
wherein the at least one processor is configured to access the at least one memory and execute at least a portion of the computer-executable instructions to:
determine, from among a plurality of operation modes, a current mode of operation, the plurality of operation modes comprising at least a decryption mode for a first signal type and a decryption processing bypass mode for a second signal type, the multi-modal device rendering audio and video content corresponding to either the first signal type or the second signal type;
activate a first receiving module of the one or more receiving modules based at least in part on the current mode of operation;
identify a signal received at the multi-modal device;
determine one or more characteristics of the signal; and
route the signal to the first receiving module to initiate processing of the signal in accordance with the current mode of operation.

9. The multi-modal device of claim 8, wherein the at least one processor is further configured to deactivate a second receiving module of the one or more receiving modules based at least in part on the current mode of operation.

10. The multi-modal device of claim 8, further comprising a demodulator configured to demodulate the signal to produce a demodulated signal, and wherein the at least one processor is configured to determine the one or more characteristics of the signals by executing the computer-executable instructions to identify a type of the signal from header information included in the demodulated signal.

11. The multi-modal device of claim 10, further comprising a decoder and a decryption chip, wherein the signal is a digital cable signal, and wherein the processing of the signal comprises:
decoding, by the decoder, the signal to produce a decoded signal; and
decrypting, by the decryption chip, the decoded signal to produce a decrypted signal.

12. The multi-modal device of claim 10, wherein the signal is an IP video signal, and wherein the processing of the signal comprises execution, by the at least one processor, of computer-executable instructions of the first receiving module to generate a system call to bypass decryption processing for the signal.

13. The multi-modal device of claim 12, wherein the processing of the signal further comprises execution, by the at least one processor, of computer-executable instructions of the kernel to unmount an encryption chip of the multi-modal device responsive to the system call.

14. The multi-modal device of claim 8, wherein the one or more receiving modules further comprise a second receiving module that is activated, and wherein the at least one processor is further configured to execute the computer-executable instructions to:
generate one or more control signals based at least in part on the one or more characteristics of the signal;
insert the one or more control signals into signal traffic comprising the signal; and
route the signal traffic comprising the one or more control signals and the signal to the first receiving module and the second receiving module,
wherein the first receiving module initiates the processing of the signal based at least in part on the one or more control signals and the second receiving module does not initiate the processing of the signal based at least in part on the one or more control signals.

15. One or more non-transitory computer-readable media storing computer-executable instructions that, responsive to execution by at least one processor, configure the at least one processor to perform operations comprising:
determining, from among a plurality of operation modes, a current mode of operation of a multi-modal device, the plurality of operation modes comprising at least a decryption mode for a first signal type and a decryption processing bypass mode for a second signal type, the multi-modal device rendering audio and video content corresponding to either the first signal type or the second signal type;
activating a first receiving module of the multi-modal device based at least in part on the current mode of operation;
determining one or more characteristics of a signal received at the multi-modal device; and
directing the signal to be routed to the first receiving module to initiate processing of the signal in accordance with the current mode of operation.

16. The one or more non-transitory computer-readable media of claim 15, the operations further comprising deactivating a second receiving module of the multi-modal device based at least in part on the current mode of operation.

17. The one or more non-transitory computer-readable media of claim 15, wherein determining one or more characteristics of the signal comprises demodulating the signal to produce a demodulated signal and identifying a type of the signal from header information included in the demodulated signal.

18. The one or more non-transitory computer-readable media of claim 17, wherein the signal is an IP video signal, and wherein the processing of the signal comprises:
generating a system call to bypass decryption processing for the signal.

19. The one or more non-transitory computer-readable media of claim 17, wherein the processing of the signal further comprises:
unmounting, by an operating system kernel of the multi-modal device, an encryption chip of the multi-modal device responsive to the system call.

20. The one or more non-transitory computer-readable media of claim 15, the operations further comprising:
generating one or more control signals based at least in part on the one or more characteristics of the signal;
inserting the one or more control signals into signal traffic comprising the signal; and directing routing of the signal traffic comprising the one or more control signals and the signal to the first receiving module and a second receiving module of the multi-modal device, wherein the second receiving module is activated, and wherein the first receiving module is configured to initiate the processing of the signal based at least in part on the one or more control signals and the second receiving module is configured to not initiate the processing of the signal based at least in part on the one or more control signals.

* * * * *